US005789333A

United States Patent [19]
Angelici et al.

[11] Patent Number: 5,789,333
[45] Date of Patent: Aug. 4, 1998

[54] CATALYST SYSTEM COMPRISING A FIRST CATALYST SYSTEM TETHERED TO A SUPPORTED CATALYST

[75] Inventors: Robert J. Angelici; Hanrong Gao, both of Ames, Iowa

[73] Assignee: Iowa State University Research Foundation, Inc., Ames, Iowa

[21] Appl. No.: 811,426

[22] Filed: Mar. 5, 1997

[51] Int. Cl.$^6$ .............................. B01J 31/00; B01J 31/16; B01J 31/28
[52] U.S. Cl. .......................... 502/113; 502/102; 502/103; 502/104; 502/114; 502/150; 502/153; 502/154; 502/155; 502/158; 502/161; 502/162; 502/166; 502/167; 502/232; 502/240; 502/245; 502/254; 502/258; 502/259; 502/261; 502/263; 502/439
[58] Field of Search .................................. 502/439, 157, 502/214, 507, 508, 523, 102, 103, 104, 113, 114, 123, 125, 127, 150, 155, 156, 154, 153, 158, 159, 161, 162, 166, 167, 169, 232, 240, 258

[56] References Cited

U.S. PATENT DOCUMENTS

| | | | |
|---|---|---|---|
| 3,997,472 | 12/1976 | O'Driscoll et al. | 252/430 |
| 4,276,195 | 6/1981 | Verkade | 252/431 P |
| 4,302,401 | 11/1981 | Oswald | 260/448 C |
| 4,383,118 | 5/1983 | Locatelli et al. | 549/517 |
| 4,737,588 | 4/1988 | Billig et al. | 556/12 |
| 4,789,753 | 12/1988 | Billig et al. | 558/85 |
| 4,898,845 | 2/1990 | Datta et al. | 502/3 |
| 4,912,032 | 3/1990 | Hoffman et al. | 435/7 |
| 5,089,536 | 2/1992 | Palazzotto | 522/16 |
| 5,177,228 | 1/1993 | Sato et al. | 554/129 |
| 5,206,399 | 4/1993 | Sayo et al. | 556/20 |
| 5,344,948 | 9/1994 | Verkade | 556/51 |
| 5,352,771 | 10/1994 | Kostic et al. | 530/345 |
| 5,405,550 | 4/1995 | Michl et al. | 252/299.01 |
| 5,464,656 | 11/1995 | Verkade | 427/248.1 |
| 5,536,860 | 7/1996 | Monkiewicz et al. | 556/413 |
| 5,567,615 | 10/1996 | Degan et al. | 435/280 |
| 5,587,439 | 12/1996 | DiMaio | 526/142 |
| 5,637,684 | 6/1997 | Cook et al. | 536/23.1 |

FOREIGN PATENT DOCUMENTS

| | | | |
|---|---|---|---|
| 0094914 | 11/1983 | European Pat. Off. | G03C 1/68 |
| 0094915 | 11/1983 | European Pat. Off. | G03C 1/68 |

OTHER PUBLICATIONS

"Tailored Metal Catalysts –Catalysis by Metal Complexes", Y. Iwasawa. ed., D. Reidel Publishing Company, Holland, 1–140 (1986).

Amer, I., et al., "Hydrogenation of Arenes by the $RhCl_3$–Aliquat 336 Catalyst Part 2. Reduction of Naphthalene Derivatives to Tetralins". *J. of Mol. Catalysts*, 34, 221–228 (1986).

Bennett, M.A., et al., "An Arene Hydrido–complex of Ruthenium (II) as Catalyst for the Homogeneous Hydrogenation of Benzene and Olefins". *J.C.S. Chem. Comm.*, 582–583 (1978).

Bennett, M.A., et al., "Dinuclear Arene Hydrido–complexes of Ruthenium (II): Reactions with Olefins and Catalysis of Homogeneous Hydrogenation of Arenes". *J.C.S. Chem. Comm.*, 312–314 (1979).

Blum, J., et al., "Catalytic Hydrogenation of Olefins, Acetylenes and Arenes by Rhodium Trichloride and Aliquat–336 Under phase transfer conditions". *Tetrahedron Lett.*, 24, 4139–4142 (1983).

Collman, J.P., et al., "Principles and Applications of Organotransition Metal Chemistry". University Science Books, Mill Valley. CA, table of contents and pp. 523–575 (1987).

Corma, A., et al., "Hydrogenation of Aromatics under mild conditions on transition metal complexes in zeolites. A cooperative effects of molecular sieves". *Catalysis Letters*, 32, 313–318 (1995).

Cornils, B., et al., "Hydrogenation –Industrial Applications", from *Applied Homogeneous Catalysts with Organometallic Compounds*, pp. 216 and 219 (1996).

Hartley, F.R., "Supported Metal Complexes –A New Generation of Catalysts", D. Reidel Publishing Company, Holland, table of contents (1985).

Januszklewicz, K.R., et al., "Exceedingly Mild, Selective and Stereospecific Phase–Transfer–Catalyzed Hydrogenation of Arenes". *Organometallics*, 2, 1055–1057 (1983).

Lapporte, S.J., et al., "Hydrogenation of Aromatics with Complex Metal Catalysts". *Communications to the Editor*, vol. 28, 1947–1948 (1963).

Michalska, Z.M., et al., "Supported Homogeneous Catalysts–Transition Metal Complexes with Polymeric Ligands". *Platinum Metals Review*, 18, 65–73 (1974).

Muetterties, E.L., et al., "Catalytic Hydrogenation of Aromatic Hydrocarbons". *Accounts of Chemical Research*, 324–331 (1979).

Okano, T., et al., "Versatile Polymer–Bound Rhodium Catalysts. Facile Hydrogenation of Aromatic Compounds in the Liquid Phase". *Chemistry Letters*, The Chemical Society of Japan, 603–606 (1982).

Pieta, D., et al., "Homogeneous Hydrogenation of Aromatic Hydrocarbons with $Rh(acac)–(P(OPh)_3)_2$ Catalyst". *J. of Mol. Catalysis*, 18, 193–195 (1983).

(List continued on next page.)

*Primary Examiner*—Bekir L. Yildirim
*Attorney, Agent, or Firm*—Schwegman, Lundberg, Woessner & Kluth, P.A.

[57] ABSTRACT

The present invention provides new catalyst formats which comprise a supported catalyst tethered to a second and different catalyst by a suitable tethering ligand. A preferred system comprises a heterogeneous supported metal catalyst tethered to a homogeneous catalyst. This combination of homogeneous and heterogeneous catalysts has a sufficient lifetime and unusually high catalytic activity in arene hydrogenations, and potentially many other reactions as well, including, but not limited to hydroformylation, hydrosilation, olefin oxidation, isomerization, hydrocyanation, olefin metathesis, olefin polymerization, carbonylation, enantioselective catalysis and photoduplication. These catalysts are easily separated from the products, and can be reused repeatedly, making these systems very economical.

19 Claims, 1 Drawing Sheet

OTHER PUBLICATIONS

Stuhl, L.S., et al., "Catalytic Homogeneous Hydrogenation of Arenes 6. Reaction Scope for the $n^3$–$C_3H_5Co$ [$P(OCH_3)_3$]$_3$ Catalyst". *J. of Am. Chem. Soc.*, 100, 2405–2410 (1978).

Yu, J.S., et al., "All–Cis Catalytic Hydrogenation of Polynuclear Aromatic Hydrocarbons by Group 5 Metal Aryloxide Compounds". *J. of Am. Chem. Soc.*, 114, 1927–1929 (1992).

CATALYST SYSTEM COMPRISING A FIRST CATALYST SYSTEM TETHERED TO A SUPPORTED CATALYST

STATEMENT OF GOVERNMENT RIGHTS

This invention was made with Government support under United States Department of Energy Contract No. W-7405-ENG-82. The Government has certain rights in this invention.

BACKGROUND OF THE INVENTION

1. Field of the Invention

The present invention relates to catalysts and catalyst systems. In particular, the present invention relates to the combination of two catalyst systems by tethering a first catalyst system onto a supported second catalyst system.

2. Background of the Art

It is well understood in the chemical synthetic art that individual chemical reactions, including those reactions used in the synthesis of specific chemical compounds, are rate controlled by a various number of factors. Many of these rate limiting or rate controlling factors are related to atomic or molecular events during the chemical reactions and processes. These factors can influence the successfulness of a synthetic procedure by affecting the energy, speed, yield and/or by-products which are produced. One useful tool in the guidance and improvement of synthetic reactions are catalysts.

Catalysts are a well known functional group of substances or materials within the chemical industry. Catalysts are usually defined as materials which alter the velocity of a specific chemical reaction and which may be recovered in an essentially unaltered state or form in their original amount at the end of a reaction. This is not an absolute definition, because catalysts may be absorbed and carried away, or converted to other forms during the chemical reaction. Catalysts are also conveniently associated with reagents in the form of a catalyst on a support of a convenient size and surface area to provide catalytic activity to the chemical reaction. Neutral materials which carry catalysts on their surfaces are called catalyst carriers. Commonly used catalyst carriers include carbon [activated or not], metal oxides [e.g., silica, titania, zirconia, etc.], diatomaceous earth, and the like.

Catalysts are usually compared on the basis of their catalytic activity. This term is a chemical engineering term which describes the ratio of the space velocity of a catalyst being tested (Ct) to the space velocity for a standard catalyst (Cs), a specifically chosen catalyst to which the test catalyst is compared, according to the formula:

Catalytic Activity=Ct/Cs.

Space velocity is the relationship between the feed rate of a reactor volume in a flow process, and is defined as the volume (or weight) of feed (measured at standard conditions) per unit of time per unit of volume of reactor per unit of weight of catalyst. It may therefore appear for a 100 $m^3$ reaction vessel with 5 kg of catalyst as an expression of 100 kg/h/100 $m^3$/5 kg as a rate expressing space velocity, with the "100 kg" being the feed flow and the "h" being the time interval for the flow with a completed reaction. Catalytic activity can also be expressed in terms of a "Maximum TOF" or moles of $H_2$ reacting per mole of catalyst per minute or simply "Turnover" (TO) and $H_2$ uptake over the total reaction time.

Catalysts are generally specific to certain types of reactions and are not generally functional as improving all chemical reactions. That is, a catalyst which alters the velocity of one chemical reaction will not alter the velocity of all chemical reactions. In fact, this ability to be selective in catalytic effects, even amongst similar or competing reactions, is termed catalytic selectivity, and is an important component in the reasoning behind the use and selection of specific catalysts. When there are competing reactions within a reaction mixture, it is critical to provide a catalyst which will favor the desired chemical reaction and not merely increase the velocity of all reactions.

Metal catalysts, usually in elemental or organometallic form, but sometimes provided in lower valency form, and particularly metals from Groups 3–12 of the periodic tables, are widely used as catalysts, particularly in procedures relating to reactions of unsaturated compounds, such as hydrocarbon compounds. Particular processes in which these types of metal catalysts find favor are hydrogenation, oxidation, carbonylation, hydroformylation (e.g., U.S. Pat. Nos. 5,177,228 and 4,789,753), hydration, solvolysis, isomerization, dimerization, oligomerization, polymerization, hydrocyanation, olefin metathesis, and hydrosilation. Metal catalysts have suffered from convenience of form (often affecting their efficiency and recoverability) and difficulty in handling during some chemical procedures.

They are known to provide difficulty in economic separation of the used catalyst (making their reuse difficult or expensive), particularly when the catalyst has been provided in a soluble form such as a metal complex or salt.

Catalysts, and especially metal catalysts have been provided in various forms to improve their recoverability, without adversely affecting their catalytic activity. Traditionally they have been provided as powders, coatings on carrier substrates, carriers on bulk surfaces, and as metal complexes which may be soluble in the reactive system. Some forms of attachment of the metal catalyst have been reported to decrease the catalytic activity (e.g., *Platinum Metals Rev.*, Z. M. Michalska and D. E. Webster, 18, 65 (1974), *Supported Metal Complexes, A New Generation of Catalysts*, F. R. Hartley (1985), and *Tailored Metal Catalysis*, Y. Iwasawa, (1986)). The catalytic activity of rhodium covalently attached to polystyrene was specifically found to be only 0.06 times that of an equivalent amount [presumably of the metal] of the homogeneous counterpart.

It has also been theorized that the combination of catalyst with supporting chemical groups can introduce undesirable functionality to the reactive system. Because of this concern, in U.S. Pat. No. 3,997,472 to O'Driscoll et al., metal catalysts were provided in a novel form in which they were entrapped in cross linked, amorphous polymeric gels. It is asserted in this patent that the provision of the metal catalysts in this form provides a readily separable, reusable and easily handled material having a catalytic activity comparable to the free catalyst. The metal catalyst is incorporated into this system by either a colloidal dispersion of the metal particles within an amorphous cross linked gel or a polymeric gel in which the catalytically-active species are dissolved and solvated by functional groups of the polymer.

U.S. Pat. No. 4,898,845 to Datta et al. discloses the use of micro crystallites dispersed in molten salts which are then deposited as thin films coated on the internal surfaces of porous supports. It is indicated that an advantage of this supported molten salt catalysis method is that the entire surface of the micro crystallites is exposed to reactants only after they diffuse into the molten salt phase.

Metal catalysts have also been provided in many various chemical formats such as chelated complexes, particularly for use in polymerization reactions, such as U.S. Pat. No. 5,089,536 to Palazzotto; EPO Applications 0 094 914 and 0 094 915 (Ciba-Geigy AG). Metal catalysts, especially rhodium metal catalysts have also been provided as complex catalysts containing organosiloxanemonophenylphosphine ligands. An advantage of this last ligand system is its ability to be readily recovered. Metal catalysts of Pd, Pt, Ni, Co, Fe, Ir, Os, Ru and/or Rh are also disclosed.

A distinction is made within the field of catalysis between homogeneous and heterogeneous catalyst systems. Homogeneous catalysts are considered to be catalyst systems in which the catalyst and reactants are in the same phase. That is, the catalyst component is distributed on a molecular or submicroscopic level (e.g., dissolved), usually in a liquid phase such as a solution (which may also be eutectic or a solid solution). In heterogeneous catalyst systems, the catalyst and reactants are in different phases, and are usually considered as more particulate in nature (rather than atomic or individually molecular), with the particles generally too large to be considered molecular in nature. There is of course a gradation between heterogeneous and homogeneous systems where the molecules become more particle-like and solutions become dispersions or suspensions, but the distinctions are still generally maintained in the art with intermediate systems referred to as transitional systems between homogeneous and heterogeneous.

Although homogeneous catalyst systems can provide a high initial activity and selectivity, homogeneous or soluble catalysts are difficult to separate from the final product. Extreme measures are therefore required to recover even a small portion of the valuable catalyst after the reaction is complete. When the catalysts include metals, there is the added concern of the environmental impact of these significant metal losses.

Heterogeneous catalyst systems are known to be more efficient than homogeneous catalyst systems because the catalyst can be easily separated from the pure product, since each is in a different phase. Also, clean up of the system and recycle of the catalyst are both much easier, and heterogeneous systems lend themselves easily to continuous processes, which can be very economical.

In U.S. Pat. No. 4,276,195 to Verkade, homogeneous transition metal complex catalysts were converted to catalysts which are heterogeneous with respect to the reactants, and which have substantially equal catalytic activity to the homogeneous catalysts. This was accomplished by reacting a normally homogeneous transition metal complex catalyst with a metal bridging ligand which substantially duplicates the ligand moiety of the metal complex, to provide a polymerized heterogeneous transition metal complex catalyst. It is asserted that the resulting solid polymer structure possesses many of the benefits of a heterogeneous catalyst, but the catalyzing effectiveness of this catalyst is only about equal to the known, "parent" homogeneous catalyst.

New and alternative formats for economical catalyst systems and for the control and introduction of catalysts and catalyst systems into reaction environments are still needed.

SUMMARY OF THE INVENTION

The present invention provides new catalyst formats which comprise a supported catalyst tethered to a second and different catalyst by a tethering ligand. The catalyst system preferably comprises a heterogeneous supported metal catalyst to which is tethered a homogeneous catalyst. The homogeneous catalyst, by being secured to or tethered to the supported catalyst system is no longer technically a homogeneous catalyst, but because of its effectively even distribution as, for example, chelated moieties extending from the surface of the supported catalyst with individual metal atoms or complexes of individual (or di- or tri- sets of metal atoms) metals atoms spatially suspended away from the supported catalyst, they functionally behave as homogeneous catalysts in the reaction environment.

In a preferred embodiment, the catalyst is a homogeneous complex catalyst tethered on a heterogeneous supported metal catalyst. For example, the heterogeneous supported metal catalyst (A) can be an inorganic oxide supported metal catalyst, such as $Pd—SiO_2$, $Ni—SiO_2$, $Ru—SiO_2$, $Au—SiO_2$, $Pd—Al_2O_3$, $Pd—MgO$ etc., and the homogeneous complex catalyst (B—C) can be a transition metal complex containing a tethering ligand (C) which can chemically bond to A. The formation of the final catalyst, B—C/A, is shown in eq. (1).

$$A + B—C \rightarrow B—C/A \qquad (1)$$

wherein:

A=Supported heterogeneous metal catalyst; metal (M) on support (S)

B—C=Homogeneous metal complex catalyst with tether C

B=Homogeneous metal complex catalyst without tether

C=tether

B—C/A=combined catalyst

B—C/S=tethered homogeneous metal complex catalyst on support (S)

This combined homogeneous-heterogeneous catalyst (B—C/A) has catalytic activity that is higher than that of the separate homogeneous catalyst (B—C), the separate heterogeneous catalyst (A) or the homogeneous complex catalyst (B—C) tethered on an inorganic oxide support (S). This combination of homogeneous and heterogeneous catalysts is easily separated from the products of the reaction, has a sufficient lifetime and possesses unusually high catalytic activity in arene hydrogenations and potentially many other reactions as well, including, but not limited to hydroformylation, hydrosilation, olefin oxidation, isomerization, hydrocyanation, olefin metathesis, carbonylation, and olefin polymerization. These catalysts can also be reused repeatedly, making these systems very economical.

With optically active ligands on the homogeneous catalyst, enantioselective catalysis of these various reactions is possible. Further, with photoinitiators tethered to the supported catalysts, photoduplication or photoinitiated unblocking may also be possible.

These and other features, aspects, and advantages of the present invention will become better understood with regard to the following description, drawings, and appended claims.

DETAILED DESCRIPTION OF THE INVENTION

A novel catalyst system or format is provided which comprises at least two different catalyst systems tethered together by a linking moiety. The term "different catalyst systems" refers to differing formats of the same catalyst even when some of the same components, e.g., the same metal, are employed. For example, a supported rhodium catalyst may have a rhodium complex tethered to its surface, and this would be considered two different catalysts. Any number of catalyst systems may be combined (e.g., more than one homogeneous catalyst system may be tethered to the supported heterogeneous catalyst, such as two, three or four different homogeneous catalysts), but preferably two different catalyst systems are used if only two different catalyst formats provide an adequate and economical system. In one embodiment, metal catalyst systems are used because the starting materials can be provided with relative ease, and the processes which may be used in the manufacture of the new catalyst formats are relatively simple. More preferably, a complexed or compounded metal catalyst is tethered to a supported metal catalyst.

In a preferred embodiment, the catalyst system consists of a homogeneous complex metal catalyst tethered to a heterogeneous supported metal catalyst. Again, it should be noted that when the homogeneous catalyst is tethered to the supported catalyst, it is no longer technically a homogeneous catalyst, but the source of the moiety (having been for a homogeneous, soluble catalyst) and/or its behavior with reactive species in the reaction solution or environment is similar to that of a truly homogeneous or intermediate catalyst.

Materials used as heterogenous catalysts in the present invention can include, but are not necessarily limited to metals, metal mixtures, intermetallic compounds, and a wide range of metal compounds including metal oxides, sulfides, halides, other binary metal compounds, hydroxides, and polynuclear metallates with oxides, sulfides, phosphates, and halides. Examples of metals which can be used in the heterogeneous supported catalysts include, but are not necessarily limited to, Pd, Pt, Ni, Co, Fe, Sn, Cd, Sr, Mg, Mn, Zn, Cr, Al, Ag, Au, Ir, Os, Ru, Ti, Zr and/or Rh.

The support for the heterogeneous catalysts of the present invention can be any suitable support intended for use with insoluble catalysts including, but not limited to carbon, organic polymers or inorganic oxides (including non-metal oxides and both metal oxides and mixed metal oxides such as zeolites). The support preferably has certain mechanical stabilities so that it remains sturdy in the machinery during catalytic reactions, and does not break into particles when reactants flow through it. Silica ($SiO_2$) is widely used commercially in large scale along with other metal oxides such as magnesium oxide, chromium oxide, and aluminum oxide because these oxides can be made into small particles with very high surface areas. High surface areas allow large amounts of material to be attached to relatively small amounts of the support, making the process more economical. Many other metal oxides can be used as well, including, but not limited to tin oxide, titanium oxide and zirconium oxide.

From the above discussion it is clear that a wide variety of heterogeneous catalysts and supports are suitable for use in the present invention. In a preferred embodiment, the supported catalyst is an inorganic oxide supported metal catalyst such as Pd—$SiO_2$, Ni—$SiO_2$, Ru—$SiO_2$, Pd—$Al_2O_3$, Pd—MgO, Au—$SiO_2$, etc.

The homogeneous catalyst can be any soluble catalyst which will accelerate the rate of reaction. Preferably the catalyst is one that has previously been demonstrated to act as a catalyst in reactions that are in solution, and can include metals, metal complexes, enzymes, acids and bases. Examples of metals which can be used in homogeneous catalysts include transition metals which are generally considered to be metals of groups 4–11 of the periodic chart, but are also considered by some in the field to include groups 2 and 3. The most commonly employed transition metals are Ti, V, Cr, Mn, Fe, Co, Ni, Zr, Mo, Re, Ru, Rh, Pd, Pt, Ta, Os, Ir, Zn and Cd, but any of the other transition metals (including the lanthanides and actinides) can be used as well. Non-transition elements can also be used in the homogeneous catalysts of the present invention including, but not limited to Sn, Sr, Mg, Sb, Se, Bi, and Al. One well-known group of homogeneous catalysts are the transition metal organometallic complex catalysts including, but not limited to complexes such as $Ni[P(OMe)_3]_4$, $RhCl_3(SR_2)_3$, $NiCl_2(PEt_3)_2$, $RhH(CO)(PPh_3)_3$, $RhCl(CO)(PPh_3)_2$, $IrCl(CO)(PPh_3)_2$, and $MoCl_2(NO)_2$. Non-transition elements and their compounds can also be used, including, but not limited to amines and aluminum alkyls. Examples of enzymes which can be used include, but are not limited to glucose isomerase and tyrosinase.

Suitable acids and bases for use as homogeneous catalysts include Lewis and Bronsted acids and bases. That is, a suitable homogeneous acidic catalyst is not only a substance which has the ability to donate protons (such as $H_2O$ and $NH4^+$) as defined by Bronsted, it can also be any substance which can form a covalent bond by accepting an electron pair from a base (such as $BF_3$, $SO_3$ and $AlCl_3$) as defined by Lewis. A suitable basic catalyst can be defined either as a substance which has the ability to accept protons as defined by Bronsted, or as a substance which has an unshared electron pair with which it can form a covalent bond with an atom, molecule or ion as defined by Lewis. Lewis and Bronsted bases are identical because, in order to accept a proton, a base must have an unshared pair of electrons. Examples of suitable basic catalysts include, but are not limited to, substances such as $NH_3$ and $OH^-$.

From the above discussion it is clear that a wide variety of homogeneous catalysts are suitable for use in the present invention. In a preferred embodiment, the homogeneous catalyst is a transition metal complex catalyst such as $[RhCl(CO)_2]_2$ which also includes a tethering ligand as described below.

The "at least two" different catalyst systems, which are preferably a homogeneous system and a heterogenous supported system, are tethered together by a suitable ligand or tethering group. The term "tethering group" refers to a chemical moiety which chemically bridges and/or secures the "at least two" catalyst systems together and can be any of the traditionally used ligand complexes. Tethering, however, does not include two different metals in complexes which are each or both mixed together into a catalytic mass, even though a complex may have a large number of chelating positions which could chelate different metals within a large micelle or the like. At least one of the catalyst systems and preferably both of the catalyst systems must be chemically (covalently) bonded to the tethering group.

Further, it is well known that a suitable tether is dependent, in part, on the type of support being used. As such, the tether will contain differing connectors at the support end depending on whether the support is an inorganic oxide, a carbon, an organic polymer or some other support. A catalyst system consisting of a metal oxide heterogeneous catalyst tethered to a transition metal homogeneous catalyst, for example, might have a tethering group (tether) with siloxy and phosphorus connectors such that the tether is covalently bonded to the heterogeneous metal catalyst through the siloxy group and to the homogeneous catalyst on the other end with the phosphorus atom. If the support for the homogeneous catalyst is changed to carbon, however, a suitable connector might instead be an acid, ester or ether group, or a group which reacts with hydrogen available from moieties on the carbon surface.

The choice of tethering ligand is also dependent on the type of homogeneous catalyst being used as well as the end result desired. Therefore, the best overall processing efficiency may require a compromise selection among numerous factors involved, for it is well known that not all ligands will provide identical results with regard to all factors under all conditions. For example, in transition metal complex catalyzed hydroformylation using a diorganophosphite ligand, such factors as product selectivity, catalyst reactivity and stability, and ligand stability are often of major concern in the selection of the desired phosphorus ligand to be employed. Moreover, such a selection may also depend on the olefinic starting material involved in the hydroformylation process, since all olefins do not have the same degree of reactivity under all conditions. For instance, internal olefins and sterically hindered alpha olefins such as isobutylene, are in general much less reactive than sterically unhindered alpha olefins. Thus, by tailoring the ligand for the specific support, the specific homogeneous catalyst, and the specific desired results for the product, the optimum process and/or catalyst performance may be obtained. It should also be noted that exposure of any catalyst to impurities, such as oxygen, during its preparation, can adversely affect the attachment of the tether to the homogeneous catalyst. It is important, therefore, to carefully follow proper laboratory techniques in the preparation of all catalysts.

One of the most convenient forms of securing the tethering group to the supported catalyst is by reaction of a metal, semi-metal or inorganic-based ester with the metal oxide surface of a supported catalyst. Such metal, semi-metal or inorganic based ester would include silane linking groups (e.g., $R_m$—Si[OR']$_n$, wherein m+n equals 4 and m is at least 1), titanate esters (e.g., $R_m$—Ti[OR']$_n$, wherein m+n equals the valence of titanium), phosphate ester counterparts, and the like. Ambifunctional materials, including silane and/or metal ester-type linkages are also useful, such as traditional coupling agents, including, but not limited to ambifunctional silanes (e.g., epoxy-terminated silanes, amino-terminated silanes, (meth)acryloyl-terminated silanes, and their titanate ester counterparts).

The central atoms of the tether can be any suitable combination or group of atoms including any hydrocarbons such as alkanes, alkenes, alkynes, arenes, phenols, or benzenes. Alternatively, the central atom or atoms can contain elements such as oxygen or nitrogen. The central atom(s) can also be non-hydrocarbon-based atoms (such as sulfur and arsenic) or non-hydrocarbon-based groups (such as silicones).

In one embodiment of the invention, the complex [RhCl(CO)$_2$]$_2$ can be tethered to the Au powder catalyst using the ligand tether HSCH$_2$CH$_2$PPh$_2$, which would likely bind the Au through the sulfur and to the Rh complex through the phosphorus. While these catalysts would likely have excellent olefin hydrogenation (1-hexene) activity, they may have relatively short lifetimes.

In a preferred embodiment, a homogeneous |RhCl(CO)$_2$|$_2$ catalyst is tethered to the SiO$_2$ support using a (EtO)$_3$Si(CH$_2$)$_3$PPh$_2$ or (MeO)$_3$Si(CH$_2$)$_3$NEt$_2$ ligand; with the Si being attached to the SiO$_2$ and the phosphorus bonded to the Rh. This attachment to the silica surface is very durable because the stability of the group itself is quite high once its reactive sites have been used in the tethering configuration.

These homogeneous-heterogeneous catalysts with the above tethers and the Rh complex on a Pd—SiO$_2$ heterogeneous catalyst exhibit unusually high activities which are clearly synergistic for the hydrogenation of arenes (benzene, toluene and anisole). For example, the Maximum TOF for 50 mg of the combined catalyst Rh(COD)(N~N)/Pd—SiO$_2$ (containing 14.3 µmol of rhodium) is 1.70 (molH$_2$/molRh min) as compared with only 0.06 (molH$_2$/molRh min) for the homogeneous rhodium complex Rh(COD)(N~N)Cl (containing 20 µmol of rhodium), and only 0.06 (molH$_2$/molRh min) for 50 mg for the normal rhodium complex catalyst tethered on silica Rh(COD)(N~N)/SiO$_2$ (containing 16.5 µmol of rhodium). Hydrogen uptake of the combined catalyst Rh(COD)(N~N)/Pd—SiO$_2$ is also much higher than the silica-supported Pd catalyst Pd—SiO$_2$. When the H$_2$ uptake of 295 mL (for an 11-hour reaction time) for the combined catalyst Rh(COD)(N~N)/Pd—SiO$_2$ is compared with the H$_2$ uptake of a heterogeneous supported palladium metal catalyst Pd—SiO$_2$, the difference is also significant, as the H$_2$ uptake of Pd—SiO$_2$ is only 23.5 mL for a total reaction time of 23 hours. (See Example 2, Table 7). The mechanism for the reaction of the combined catalyst is thought to be activation of the hydrogen on the Pd where it spills over onto the SiO$_2$. The active hydrogen on the SiO$_2$ then transfers to the arene which is activated by the homogeneous catalyst.

It should be noted that with use of optically active ligands, enantioselective catalysis of these various reactions is possible. Such ligands in the homogeneous complex catalyst can include optically active amino acids, diamines, diphosphines, diphosphates and many others. It is likely that any substance having optically active characteristics can be used, whether or not the optical activity is caused by an asymmetric carbon atom as in |(−)-lactic acid or (+)-lactic acid| or by having a center of dissymmetry caused by some other structural feature.

Further, with photoinitiators such as aromatic iodonium salts, sulfonium salts, diazonium salts, bisimidazoles, and s-triazines, tethered to the supported catalysts, photoduplication or photoinitiated unblocking may also be possible. Specifically, it is possible to design a surface such that one portion is masked or blocked and the remainder is not masked, such that a catalyzed reaction takes place on the unblocked portion creating the desired image.

A general synthetic procedure for manufacturing the novel catalyst formats of the present invention would be to first provide a catalyst on a catalyst carrier (e.g., a supported catalyst as is well understood in the art). A reactive compound is provided comprising a catalyst moiety secured to a tethering linkage having an end group which is reactive with said supported catalyst (either through the catalyst or through the support) under conditions in which the end group is not as reactive (preferably insignificantly reactive or non-reactive) with the homogeneous catalyst moiety. The end group is then reacted with the supported catalyst to tether the catalyst moiety to the supported catalyst. This process thus forms a supported catalyst to which a distinct catalyst moiety has been tethered. As stated above and as will be shown in the following, non-limiting examples, some of these inventive catalyst formats provide catalytic activity which is clearly synergistic, with the additive catalytic activities of the individual catalyst systems (the supported catalyst and the homogeneous catalyst moiety) adding up to an amount which is less than the catalytic activity of the tethered format for a specific reaction. This is clearly an unexpected and unobvious result emphasizing the uniqueness of the present invention.

In an alternative embodiment, instead of attaching a homogeneous catalyst through a tether to a heterogeneous supported metal catalyst, the format for this combination of homogeneous and heterogeneous catalysts can be to attach the homogeneous catalyst through a tether to a suitable carrier, such as silica, that is separate from the carrier of the supported metal catalyst. Thus, the overall catalyst can consist of two types of catalyst particles: (1) particles of a carrier to which a homogeneous catalyst is tethered, and (2) particles of a carrier-supported metal catalyst. These two types of particles can be intimately mixed to give the overall catalyst.

Alternatively, it is also possible to have one type of catalyst particle packed on top of the other type of catalyst particle. These alternative formats for the tethered homogeneous and heterogeneous supported metal catalyst would likely be particularly suitable for catalysts involving hydrogenation or dehydrogenation, for which hydrogen spillover from one carrier particle to another has been demonstrated. It is possible that migration of other activated reactants or intermediates from one particle to another also occurs. Reactions involving such migration can also be catalyzed synergistically by the two components of the catalyst.

Advantages of these alternative formats include the fact that different carriers for the tethered homogeneous and supported metal catalyst can be used, which would allow the catalytic activity of the overall catalyst to be adjusted. Furthermore, carriers can be chosen for ease of preparation of the two components of the overall catalyst and catalyst recovery would also be less costly.

The invention will be further described by reference to the following examples which are offered to further illustrate various embodiments of the present invention. It should be understood, however, that many variations and modifications may be made while remaining within the scope of the present invention.

EXAMPLE 1

The catalytic activity of tethered rhodium complexes, silica-supported metal catalysts in the hydrogenation of arenes is investigated.

1. Synthesis of Catalysts Consisting of Rhodium Complexes Tethered to Silica-supported Metals
(1) Preparation of different tethered rhodium catalysts by Methods (A) and (B)

METHOD A

Preparation of Rh—P/M—SiO₂ or Rh—P/SiO₂

(1) 1/2 [Rh(CO)₂Cl]₂ + 2(EtO)₃Si(CH₂)₃PPh₂ ⟶

[(EtO)₃Si(CH₂)₃PPh₂]₂Rh(CO)Cl

(2) [(EtO)₃Si(CH₂)₃PPh₂]₂Rh(CO)Cl + M—SiO₂ ⟶

(Rh—P/M—SiO₂)

OR (2) [(EtO)₃Si(CH₂)₃PPh₂]₂Rh(CO)Cl + SiO₂ ⟶

(Rh—P/SiO₂)

Preparation of Rh—N/M—SiO₂ or Rh—N/SiO₂

(1) 1/2 [Rh(CO)₂Cl]₂ + (MeO)₃Si(CH₂)₃NEt₂ ⟶

[(MeO)₃Si(CH₂)₃NEt₂]Rh(CO)₂Cl (2) [(MeO)₃Si(CH₂)₃NEt₂]Rh(CO)₂Cl + M—SiO₂ ⟶

M—SiO₂—O—SiCH₂CH₂CH₂NEt₂—Rh(CO)₂Cl  (Rh—N/M—SiO₂)

OR (2) [(MeO)₃Si(CH₂)₃NEt₂]Rh(CO)₂Cl + SiO₂ ⟶

SiO₂—OSi(CH₂)₃NEt₂—Rh(CO)₂Cl  (Rh—N/SiO₂)

METHOD B

Preparation of Rh/P—(M—SiO₂)

(1) M—SiO₂ + (EtO)₃Si(CH₂)₃PPh₂ ⟶

M—SiO₂—OSi(CH₂)₃PPh₂

(2) M—SiO₂—OSi(CH₂)₃PPh₂ + [Rh(CO)₂Cl]₂ ⟶

M—SiO₂—OSi(CH₂)₃PPh₂—Rh(CO)₂Cl  (Rh/P—(M—SiO₂))

Preparation of Rh/N—(M—SiO₂)

(1) (MeO)₃Si(CH₂)₃NEt₂ + M—SiO₂ ⟶

M—SiO₂—OSi(CH₂)₃NEt₂

(2) M—SiO₂—OSi(CH₂)₃NEt₂ + [Rh(CO)₂Cl]₂ ⟶

M—SiO₂—O—Si(CH₂)₃NEt₂—Rh(CO)₂Cl  (Rh/N—(M—SiO₂))

Preparation of Rh/N—SiO₂

(1) (MeO)₃Si(CH₂)₃NEt₂ + SiO₂ ⟶

SiO₂—OSi(CH₂)₃NEt₂

(2) SiO₂—OSi(CH₂)₃NEt₂ + 1/2 [Rh(CO)₂Cl]₂ ⟶

-continued

M = Pd, Au, Ni (2) Preparation of silica supported metal catalysts
Preparation of silica-supported nickel catalyst (Ni—SiO$_2$)

A solution of Ni(NO$_3$)$_2$6H$_2$O (2.4 g) in 40 mL water was added dropwise to a flask containing 5.0 g SiO$_2$, then about 30 mL water was added dropwise. The resultant slurry was vigorously stirred on a hot plate until all excess liquid was evaporated; the resulting solid was dried in a furnace at 120° C. under flowing air overnight. The solid was reduced under a H$_2$ flow at 450° C. for 6 h and then cooled in a N$_2$ atmosphere. The black silica-supported nickel catalyst, Ni—SiO$_2$, has a Ni content of 10 wt %.

Preparation of silica-supported gold catalyst (Au—SiO$_2$)

A mixture of 5 g silica and 1 g HAuCl$_4$×H$_2$O (Au, 49%) in 80 mL water containing 2 mL concentrated HCl was stirred at room temperature overnight. The water was evaporated in vacuum and the resulting solid was dried in an oven at 110° C. for 5 hours. Then, the solid was reduced in a furnace by flowing H$_2$ at 250° C. for 4 hours. The red-brown Au—SiO$_2$ powder contained 10% Au by weight.

Preparation of silica-supported palladium catalyst (Pd—SiO$_2$)

PdCl$_2$ (1.17 g) was dissolved in 80 mL of aqueous HCl (0.2M). The aqueous solution of H$_2$PdCl$_4$ that formed was added slowly to a flask containing 7 g SiO$_2$. After stirring the mixture at room temperature overnight, the water was removed by slow evaporation under vacuum. After drying at 110° C. for 5 hours, the solid sample was calcined at 500° C. under an air flow for 4 hours. The calcined sample was subsequently reduced under a H$_2$ flow for 4 hours at 380° C., followed by passivation under flowing air at room temperature for 1 hour. The black Pd—SiO$_2$ powder contained 10% Pd by weight.

(3) Preparation of Si- and P-containing reactants used in synthesis of catalysts consisting of rhodium complexes tethered to silica-supported metals Preparation of (3-triethoxysilylpropyl)diphenylphosphine ((C$_2$H$_5$O)$_3$SiCH$_2$CH$_2$CH$_2$P(C$_6$H$_5$)$_2$) or (EtO)$_3$Si(CH$_2$)$_3$PPh$_2$ This synthesis is similar to the synthesis described in *Selective Phosphination of (3-chloropropyl)triethoxysilane, a New Route to Alkoxysilyl-Substituted Phosphines*, Syn. React. Inorg. Metal-Org. Chem., M. Capka, 7, 347 (1977).

Finely cut thin lithium plates (1 g) were added to a solution of diphenylchlorophosphine in 50 mL THF. An instant exothermic reaction took place, the color of the solution turning deep orange. After the reaction subsided, the mixture was allowed to stir overnight and then filtered. The resulting solution of lithium diphenylphosphide was dropwise added to a solution of (3-chloropropyl) triethoxysilane (12 g) in 60 mL THF while the temperature of the mixture was maintained below 15° C. The solution became light gray immediately. After the addition was completed, the reaction mixture was stirred for another 3 hours and then allowed to stand overnight. Most of the THF was removed by distillation. The inorganic salts were removed by filtration, and the filtrate was distilled under vacuum to give the product of (3-triethoxysilyl)propyl diphenylphosphine (b.p., ~200° C./0.3 mmHg). $^1$H NMR (CDCl$_3$): 7.32–7.42 (m, 10H), 3.77 (m, 6H), 2.12 (m, H), 1.60 (m, 2H), 1.18 (t, 9H), 0.81 (t, 2H).

Preparation of [(C$_2$H$_5$O)$_3$SiCH$_2$CH$_2$CH$_2$P(C$_6$H$_5$)$_2$]$_2$Rh(CO)Cl A mixture of 0.43 g (1.1 mmol) [Rh(CO)$_2$Cl]$_2$ and 1.71 g (4.4 mmol) (C$_2$H$_5$O)$_3$SiCH$_2$CH$_2$CH$_2$PPh$_2$ in 55 mL toluene was stirred at room temperature for 2 hours. Then, the solution was evaporated in vacuum to a small volume and pentane was added to give a yellow precipitate of the carbonyl rhodium phosphine complex. IR (vCO, in toluene): 1967 cm$^{-1}$.

(4) Preparation of catalysts consisting of rhodium-phosphine complexes tethered to silica and silica-supported metals by method A Catalyst consisting of a rhodium-phosphine complex tethered to silica-supported gold (Rh—P/Au—SiO$_2$): A mixture of 0.5 g Au—SiO$_2$ and 0.1 g [(C$_2$H$_5$O)$_3$SiCH$_2$CH$_2$CH$_2$PPh$_2$]$_2$Rh(CO)Cl in 20 mL toluene was refluxed under N$_2$ atmosphere overnight. After the solution was filtered, the solid was washed with toluene (6×15 mL) and pentane (30 mL) and dried in vacuum. The resulting Rh—P/Au—SiO$_2$ catalyst had a Rh content of 0.60% by weight. IR (vCO, Nujol mull): 1981 cm$^{-1}$.

Catalyst consisting of a rhodium-phosphine complex tethered to silica-supported palladium (Rh—P/Pd—SiO$_2$) or nickel (Rh—P/Ni—SiO$_2$): The procedure is the same as that for the preparation of Rh—P/Au—SiO$_2$ by using Pd—SiO$_2$ or Ni—SiO$_2$ instead of Au—SiO$_2$.

Catalyst consisting of a rhodium-phosphine complex tethered on silica (Rh—P/SiO$_2$): Using the same method as for the preparation of Rh—P/Au—SiO$_2$, the Rh—P/SiO$_2$ catalyst was prepared by using SiO$_2$ instead of Au—SiO$_2$. IR (vCO, Nujol mull): 1980 cm$^{-1}$. Rh content: 0.60 wt %.

(5) Preparation of a toluene solution of [(MeO)$_3$Si(CH$_2$)$_3$NEt$_2$]Rh(CO)$_2$Cl A mixture of [Rh(CO)$_2$Cl]$_2$ (0.080 g, 0.19 mmol) and (MeO)$_3$Si(CH$_2$)$_3$NEt$_2$ (0.22 g, 0.70 mmol) in 15 mL toluene was stirred at room temperature for 30 min. After filtration, a yellow toluene solution of [(MeO)$_3$Si(CH$_2$)$_3$NEt$_2$]Rh(CO)$_2$Cl was obtained. IR (vCO, cm$^{-1}$): 2083 (s), 2000 (s).

(6) Preparation of catalysts consisting of a rhodium-amine complex tethered to silica and silica-supported metals by Method A Catalyst consisting of a rhodium-amine complex tethered to silica-supported palladium (Rh—N/Pd—SiO$_2$A mixture of 1 g Pd—SiO$_2$ (Pd, 10 wt %) and the toluene solution of [(MeO)$_3$Si(CH$_2$)$_3$NEt$_2$]Rh(CO)$_2$Cl (10 mL) prepared as above (in section (5)) in 20 mL toluene was refluxed for four hours. After filtration, the solid was washed with toluene (15 mL×3) and pentane (20 mL×1). Then the solid was dried in vacuum and the tethered rhodium-amine complex catalyst (Rh—N/Pd—SiO$_2$) was obtained.

Catalyst consisting of a rhodium-amine complex tethered to silica (Rh—N/SiO$_2$), silica-supported gold (Rh—N/Au—SiO$_2$) and nickel (Rh—N/Ni—SiO$_2$)

The Rh—N/SiO$_2$, Rh—N/Au—SiO$_2$ and Rh—N/Ni—SiO$_2$ catalysts were prepared in the same manner as Rh—N/Pd—SiO$_2$ by using SiO$_2$, Au—SiO$_2$, or Ni—SiO$_2$ instead of Pd—SiO$_2$.

(7) Preparation of a catalyst consisting of a rhodium-phosphine complex tethered to silica or silica-supported metals by Method B Catalyst consisting of a rhodium-phosphine complex tethered on silica-supported palladium (Rh/P—(Pd—SiO$_2$)) A mixture of Pd—SiO$_2$ (1 g) and (EtO)$_3$Si(CH$_2$)$_3$PPh$_2$ (0.5 mL) in 20 mL toluene was refluxed overnight. After filtration, the solid was washed with toluene (15 mL×2) and dried in vacuum. In some preparations, the resulting solid was reacted further with 5 mL of (CH$_3$)$_3$SiCl in 20 mL toluene at room temperature overnight in order to protect any unreacted surface Si—OH groups. After filtration, the solid was washed with toluene (15 mL×2) and dried in vacuum.

The resulting phosphine ligand tethered on Pd—SiO$_2$ was stirred with [Rh(CO)$_2$Cl]$_2$ (0.04 g) in 20 mL toluene at room temperature overnight. The mixture was filtered, and the solid was washed with toluene (15 mL×6) and dried in vacuum, giving Rh/P—(Pd—SiO$_2$).

Catalyst consisting of rhodium-amine complex tethered to silica (Rh/N—SiO$_2$) and silica supported palladium (Rh/N—(Pd—SiO$_2$)): The Rh/N—(Pd—SiO$_2$) catalyst was obtained in the same way as (Rh/P—(Pd—SiO$_2$), except (MeO)$_3$Si(CH$_2$)$_3$NEt$_2$ was used instead of (EtO)$_3$Si(CH$_2$)$_3$PPh$_2$. The silica tethered rhodium catalyst, Rh/N—SiO$_2$ was prepared with SiO$_2$ instead of Pd—SiO$_2$.

TABLE 1

Rhodium content and vCO bands (nujol mull) of catalysts consisting of rhodium complexes tethered on silica and silica-supported metals

| Catalyst | Rhodium content (wt %) | vCO (cm$^{-1}$) |
|---|---|---|
| Rh—P/SiO$_2$ | 0.60 | 1980 |
| Rh—P/Pd—SiO$_2$ | 0.65 | 1980 |
| Rh—P/Au—SiO$_2$ | 0.60 | 1982 |
| Rh—P/Ni—SiO$_2$ | 0.60 | 1979 |
| Rh/P—(Pd—SiO$_2$) | 1.05 | 2086, 2076, 2018, 1992 |
| Rh—N/SiO$_2$ | 2.80 | 2069, 1994 |
| Rh/N—SiO$_2$ | 4.00 | 2078, 2001 |
| Rh—N/Pd—SiO$_2$ | 1.25 | 2075, 2001 |
| Rh—N/Au—SiO$_2$ | 0.85 | 2075, 1998 |
| Rh—N/Ni—SiO$_2$ | 3.65 | 2076, 2002 |
| Rh/N—(Pd—SiO$_2$) | 1.70 | 2071, 1993 |

Table 1 shows the rhodium content and the carbonyl band positions of the ethered rhodium complex catalysts. It can be seen that the vCO positions of the carbonyl rhodium complex tethered on silica-supported metal catalysts are nearly the same as those of the rhodium carbonyl complex tethered on silica. Moreover, the vCO bands of the rhodium carbonyl amine complex tethered on silica or Pd—SiO$_2$ by method A are similar to those of the corresponding tethered rhodium complex prepared by method B. However, the vCO of the rhodium carbonyl phosphine complex tethered on the silica-supported palladium catalyst prepared by method A are different from that of the tethered rhodium complex prepared by method B. In the latter case, two kinds of rhodium complexes may be formed on the support; one is the complex like [(EtO)$_3$Si(CH$_2$)$_3$PPh$_2$]$_2$Rh(CO)Cl; the other is probably a complex like [(EtO)$_3$Si(CH$_2$)$_3$PPh$_2$]Rh(CO)$_2$C. These results suggest that in the catalysts consisting of a rhodium complex tethered to a silica-supported metal, the interaction between the rhodium carbonyl complex and the supported metal is not so strong as to be observed by its IR vCO adsorption.

2. Catalytic Properties of the Catalysts Containing Tethered Rhodium Complexes in the Hydrogenation of Arenes The hydrogenation reactions were carried out in a three necked, jacketed bottle closed with a self-sealing silicon rubber cap; the bottle was connected to a vacuum/hydrogen line and a constant pressure gas buret. The temperature of the ethylene glycol that circulates through the jacket was maintained with a constant temperature bath. The reaction temperature and H$_2$ pressure were 40° C. and 1 atm (0.1 MPa), respectively. After the catalyst was added and the atmosphere in the bottle was replaced with hydrogen, 5 mL toluene was added and the hydrogen uptake was followed with the constant-pressure gas buret. The product was analyzed by gas chromatography.

Table 2 gives the activity of the tethered rhodium catalysts prepared by method A in the hydrogenation of toluene. As the data illustrates in Table 2, the tethered rhodium carbonyl amine complex catalysts are more active than the corresponding tethered rhodium carbonyl phosphine complex catalysts. The activity of the catalysts consisting of a rhodium complex tethered on a silica-supported metal catalyst is much higher than those tethered on silica; the exception to this statement is the Rh—N/Au—SiO$_2$ catalyst, which is less active than the silica tethered catalyst, Rh—N/SiO$_2$. The catalyst consisting of the rhodium amine complex tethered to silica-supported palladium, Rh—N/Pd—SiO$_2$, is a very active catalyst for the hydrogenation of toluene under the mild conditions of 40° C. and 0.1 MPa. Its activity is up to 7.0 molH$_2$/molRh min.

TABLE 2

Hydrogenation of toluene catalyzed by various supported metal and tethered rhodium complex catalysts prepared by method A

| Catalyst | Reaction time (h) | Maximum TOF[b] (molH$_2$/molRh min) | TO[a] (molH$_2$/molRh) | H$_2$ uptake[a] (mL) |
|---|---|---|---|---|
| Au—SiO$_2$ | 10 | — | — | 0 |
| Ni—SiO$_2$ | 10 | — | — | 0 |
| Pd—SiO$_2$ | 23 | — | — | 23.5 |
| Rh—P | 24 | 0.07 | 6.6 | 14.8 |
| Rh—P/SiO$_2$ | 23 | 0.29 | 360.5 | 23.5 |
| Rh—P/Au—SiO$_2$ | 22 | 0.90 | 678.2 | 39.5 |
| Rh—P/Ni—SiO$_2$ | 23 | 0.25 | 272.0 | 17.7 |
| Rh—P/Pd—SiO$_2$ | 23 | 2.90 | 1939.7 | 137.3 |
| Rh—N/SiO$_2$ | 23 | 0.80 | 759.0 | 231.2 |
| Rh—N/Au—SiO$_2$ | 20 | 0.60 | 664.9 | 61.5 |
| Rh—N/Ni—SiO$_2$ | 6.5 | 1.20 | 421.5 | 167.1 |
| Rh—N/Pd—SiO$_2$ | 13 | 7.00 | 5036.9 | 684.9 |

[a]Turnover and H$_2$ uptake correspond to the reaction time.
[b]TOF defined as moles of H$_2$ reacting per mole rhodium per min.
Reaction conditions: catalyst, 50 mg; toluene, 5 mL; 40° C., 0.1 MPa.

(1) Effect of substrates and solvents on the rates of arene hydrogenation

The activities (TOF and TO) of the catalysts, Rh—P/Pd—SiO$_2$ and Rh—N/Pd—SiO$_2$, for the hydrogenation of various substrates in different solvents are listed in Table 3. The data in Table 3 show that the activities of both catalysts for the hydrogenation of benzene and toluene in benzene or toluene are higher than those in ethanol. For the catalyst Rh—P/Pd—SiO$_2$, the activity for the hydrogenation of benzene is higher than that for the hydrogenation of toluene, but for the catalyst Rh—N/Pd—SiO$_2$ it is just the opposite. From the results shown in Table 3, it can be concluded that the electronic donor substituent group favors the hydrogenation of the substituted aromatic derivatives. Especially, the activity for the hydrogenation of anisole is about 2.5 times higher than that for the hydrogenation of benzene. This is contrary to the results obtained with other catalysts reported in the literature, e.g., see T. Okano, et al., "Versatile Polymer-Bound Rhodium Catalysts-Facile Hydrogenation of Aromatic Compounds in the Liquid Phase", Chemistry Letters, 603–606 (1982) and A. Corma, et al., "Hydrogenation of Aromatics Under Mild Conditions on Transition Metal Complexes in Zeolites. A Cooperative Effect of Molecular Sieves," Catal. Lett., 32, 313 (1994).

(3) Effect of the preparation method on the activity of catalysts

Table 5 gives results of the hydrogenation of toluene catalyzed by tethered rhodium catalysts prepared by method B. It was found that if after the reaction of the silica or silica-supported palladium with the phosphine silane or amine silane, the resulting ligand-tethered silica further reacted with chlorotrimethylsilane to convert the —OH group on the silica surface to —OSi(CH$_3$)$_3$, and finally reacted with [Rh(CO)$_2$Cl]$_2$, the obtained catalysts are inactive for the hydrogenation of toluene (see entries 1–3 in

TABLE 3

Effects of substrates and solvents on catalytic activity

| Catalyst | Substrate | Solvent | Maximum TOF[d] (molH$_2$/molRh min) | TO[a] (molH$_2$/molRh) |
|---|---|---|---|---|
| Rh—P/Pd—SiO$_2$ | [b]benzene | benzene | 2.9 | 2356 (24) |
| | [b]toluene | toluene | 2.1 | 1697 (24) |
| | [c]benzene | ethanol | 1.2 | 918 (24) |
| Rh—N/Pd—SiO$_2$ | [b]benzene | benzene | 7.0 | 2010 (8) |
| | [b]toluene | toluene | 7.0 | 3283 (8) |
| | [c]benzene | ethanol | 3.0 | 749 (6.5) |
| | [c]toluene | ethanol | 3.3 | 1214 (7) |
| | [c]naphthalene | ethanol | 4.7 | 1413 (9) |
| | [c]anisole | ethanol | 7.6 | 2169 (6.5) |

[a]Turnover corresponds to the reaction time in parentheses (in h).
[b]Reaction conditions: catalyst, 50 mg; substrate + solvent, 5 mL; 40° C., 0.1 MPa.
[c]Reaction conditions: catalyst, 50 mg; substrate, 4 mmol; solvent, 5 mL ethanol; 40° C., 0.1 MPa.
[d]TOF defined as moles of H$_2$ reacting per mole rhodium per min.

(2) Effect of palladium content on the catalytic activity of Rh—P/Pd—SiO$_2$

Table 4 gives the activity of two Rh—P/Pd—SiO$_2$ catalysts with different palladium contents in the hydrogenation of benzene. It is obvious that the catalyst with more palladium is more active. This indicates that the palladium content affects the activity of the catalyst.

TABLE 4

Effect of palladium content on the activity of Rh—P/Pd—SiO$_2$

| Pd content (wt %) | Maximum TOF[b] (molH$_2$/molRh min) | TO[a] (molH$_2$/molRh) |
|---|---|---|
| 0 | 0.20 | 188 (24) |
| 5 | 0.32 | 346 (24) |
| 10 | 2.90 | 2356 (24) |

[a]Turnover corresponds to the reaction time in parentheses (in h)
[b]TOF defined as moles of H$_2$ reacting per mole rhodium per min.
Reaction conditions: catalyst, 50 mg; benzene, 5 mL; 40° C., 0.1 MPa.

Table 5). However, if the ligand-tethered silica does not further react with chlorotrimethylsilane, and directly reacts with [Rh(CO)$_2$Cl]$_2$, the resulting tethered rhodium catalyst is active for the hydrogenation of toluene (see entry 4 in Table 5). Yet the activity of the catalyst prepared by this way is much lower than that of the catalyst prepared by method A. At this time, the reason for this phenomenon is not known.

TABLE 5

Catalytic activity of the tethered rhodium catalysts prepared by method B[a]

| Entry | Catalyst | Reaction time (h) | TOF (molH$_2$/molRh min) | TO (molH$_2$/molRh) |
|---|---|---|---|---|
| 1[b] | Rh/N—SiO$_2$ | 3.5 | 0 | 0 |
| 2[b] | Rh/P—(Pd—SiO$_2$) | 5.5 | 0 | 0 |
| 3[b] | Rh/N—(Pd—SiO$_2$) | 3.5 | 0 | 0 |
| 4 | Rh/N—(Pd—SiO$_2$) | 5.5 | 0.28 | 72 (5) |

[a]Reaction conditions are the same as those in Table 2.
[b]In the preparation of this catalyst, the silica support, was treated with chlorotrimethylsilane as described above.

17

(4) Effect over time on catalytic activity of catalysts left exposed to air

It is very interesting that when the catalysts, Rh—N/Pd—SiO$_2$ and Rh—N/SiO$_2$, stand in air for some days, the activity of both catalysts for the hydrogenation of toluene increases (Table 6). An IR analysis of these two catalysts shows that after the catalysts stand in air for more than one week, Rh—N/SiO$_2$ no longer has vCO adsorptions, but for Rh—N/Pd—SiO$_2$ the two carbonyl bands still appear at about 2075 and 2000 cm$^{-1}$, even standing for a longer time.

Figure 1:
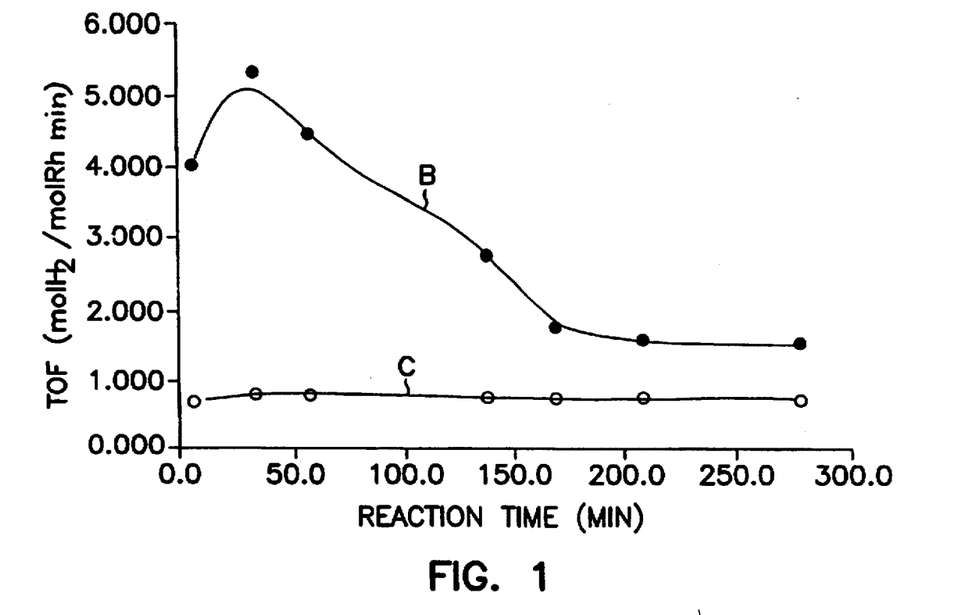
FIG. 1 is a graph showing moles of $H_2$ reacting per mole of rhodium per minute (TOF) versus reaction time in minutes for the hydrogenation of toluene over $Rh—N/SiO_2$ as described in Example 1.

In addition, as shown in FIG. 1, although after standing in air for two weeks, the activity of the catalyst Rh—N/SiO$_2$ (B in FIG. 1) initially increases to a maximum of about 5.3 TOF at about 40 minutes, and then gradually decreases over time, but still remains higher several hours later than the level of fresh catalyst (Rh—N/SiO$_2$) shown as C in FIG. 1. (The fresh catalyst maintains a nearly constant TOF level of about 0.8 over the 4.5 hours period.)

Figure 2:
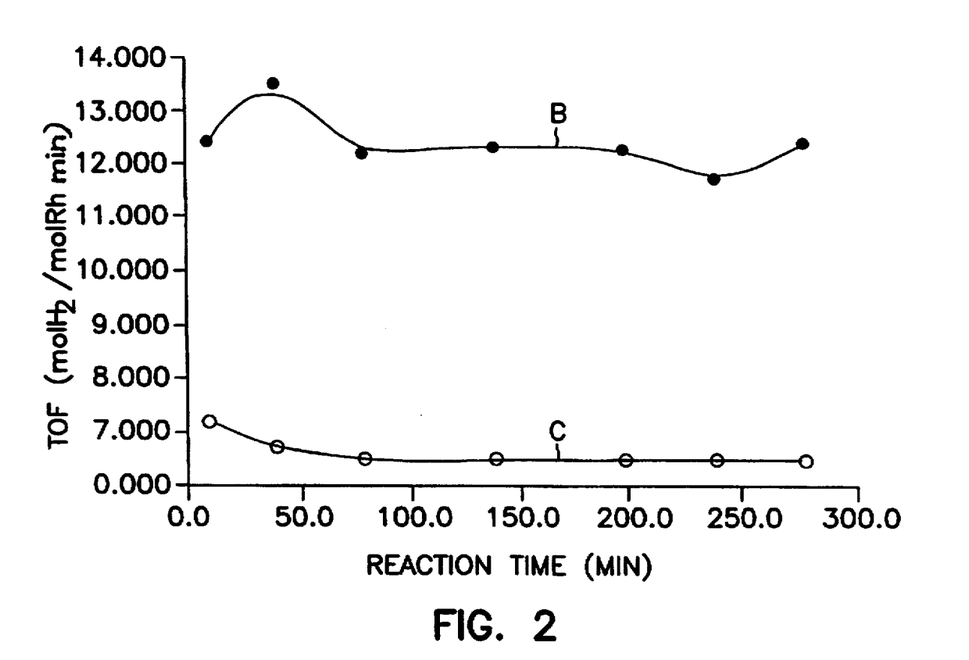
FIG. 2 is a graph showing moles of $H_2$ reacting per mole of rhodium per minute (TOF) versus reaction time in minutes for the hydrogenation of toluene over $Rh—N/Pd—SiO_2$ as described in Example 1.

As shown in FIG. 2, the stability of Rh—N/Pd—SiO$_2$ (B in FIG. 2), does not change remarkably even after standing in air for three weeks as the TOF remains about 12.0 as compared to fresh Rh—N/Pd—SiO$_2$ (C in FIG. 2) which remains around 6.5 TOF.

It is also observed that the catalytic activity of Rh—P/Pd—SiO$_2$ for the hydrogenation of toluene increases upon exposure to air. It is evident that some changes are occurring in these catalysts in air. This could involve migration of the rhodium complex from its connecting group (N or P) on the tether to the surface of the silica. Migrations of this type might be reduced or prevented by using bidentate or other polydentate connecting groups. An example of a bidentate group that should be useful for this purpose is (EtO)$_3$Si(CH$_2$)$_3$PPhCH$_2$CH$_2$PPh$_2$.

TABLE 6

Hydrogenation activities[a] of Rh—N/SiO$_2$ and Rh—N/Pd—SiO$_2$ after standing in air

| Catalyst | Standing time in air (days) | Maximum TOF[b] (molH$_2$/molRh min) | TO[c] (molH$_2$/molRh) |
|---|---|---|---|
| Rh—N/SiO$_2$ | 2 | 0.8 | 145 (5) |
|  | 10 | 4.0 | 706 (5) |
|  | 14 | 5.3 | 771 (5) |
| Rh—N/Pd—SiO$_2$ | 2 | 7.0 | 1963 (5) |
|  | 12 | 9.0 | 2641 (5) |
|  | 20 | 13.7 | 3670 (5) |

[a]Reaction conditions are the same as those in Table 2.
[b]TOF defined as moles of H$_2$ reacting per mole rhodium per min.
[c]Turnover corresponds to the reaction time in parentheses (in h).

In conclusion, the catalysts consisting of rhodium complexes tethered to silica-supported metals are very active for the hydrogenation of arenes under the mild conditions of 40° C. and 0.1 MPa.

EXAMPLE 2

Catalyst: Rh(COD)(N~N)/Pd—SiO$_2$

Catalytic reaction: hydrogenation of toluene to methylcyclohexane

A=Pd—SiO$_2$ (silica supported palladium catalyst)

B—C=Rh(COD)(N~N)Cl (COD=1,5-cyclooctadiene, N~N=H$_2$NCH$_2$CH$_2$NH(CH$_2$)$_3$Si(OC$_2$H$_5$)$_3$)

C=H$_2$NCH$_2$CH$_2$NH(CH$_2$)$_3$Si(OC$_2$H$_5$)$_3$,

B—C/A=Rh(COD)(N~N)/Pd—SiO$_2$

These components refer to those listed in the "Summary of the Invention" above.

1) Preparation of the catalysts

The silica-supported palladium catalyst (Pd—SiO$_2$) was prepared as described in Example 1, section 1, subsection (2).

A mixture of [Rh(COD)Cl]$_2$ (0.090 g, 0.25 mmol) and (C$_2$H$_5$O)$_3$Si(CH$_2$)$_3$NHCH$_2$CH$_2$NH$_2$ (0.12 mL, 0.50 mmol) in 10 mL CH$_2$Cl$_2$ was stirred at room temperature for 1 hr to obtain a CH$_2$Cl$_2$ solution of RhCl(COD)(N~N). The resulting solution was added to a flask containing 1.0 g Pd—SiO$_2$ under vacuum. The mixture was refluxed for 4 hrs. After filtration, the solid was washed with CH$_2$Cl$_2$ (2×15 mL) and dried in vacuum at room temperature. The rhodium content of the Rh(COD)(N~N)/Pd—SiO$_2$ catalyst was 2.95 wt %.

The rhodium complex catalyst tethered on SiO$_2$, RhCl(COD)[H$_2$NCH$_2$CH$_2$NH(CH$_2$)$_3$Si(OC$_2$H$_5$)$_3$/SiO$_2$, (Rh(COD)(N~N)/SiO$_2$), was prepared by the same method that was used for the preparation of Rh(COD)(N~N)/Pd—SiO$_2$ by using SiO$_2$ instead of Pd—SiO$_2$. The rhodium content of this catalyst was 3.4 wt %.

(2) Hydrogenation of toluene

These reactions are performed as described in Section 2 of Example 1.

(3) Results

The activities of the catalysts are shown in Table 7.

TABLE 7

Hydrogenation of toluene to methylcyclohexane

| Run | Catalyst | Maximum TOF[a] (molH$_2$/molRh min) | TO[b] (molH$_2$/molRh) | H$_2$ uptake[b] (mL) |
|---|---|---|---|---|
| 1 | Pd—SiO$_2$ (50 mg) | — | — | 23.5 (23) |
| 2 | Rh(COD)(N~N)Cl (20 µmol) | 0.06 | 23 (13.5) | 10 (13.5) |
| 3 | Rh(COD)(N~N)/SiO$_2$ (50 mg, 16.5 µmole Rh) | 0.06 | 70 (24) | 26 (24) |
| 4 | Rh(COD)(N~N)/Pd—SiO$_2$ (50 mg, 14.3 µmol Rh) | 1.70 | 921 (11) | 295 (11) |

[a]TOF defined as moles of H$_2$ reacting per mole rhodium per min.
[b]Turnover and H$_2$ uptake correspond to the reaction time in parentheses (in h).

(4) Discussion

From the data in Table 7, it can be seen that the activity of the combined catalyst Rh(COD)(N~N)/Pd—SiO$_2$ (Run 4) is much higher than that of the homogeneous rhodium complex catalyst Rh(COD)(N~N)Cl (Run 2) and the heterogeneous supported palladium metal catalyst (Run 1). It is also much higher than that of the normal rhodium complex catalyst tethered on silica, Rh (COD)(N~N)/SiO$_2$ (Run 3). The combined catalyst, Rh(COD)(N~N)/Pd—SiO$_2$ was characterized by Diffuse Reflectance Infrared Fourier Transform Spectroscopy (DRIFTS) using CO as a probe, before and after hydrogenation. The catalyst was stirred in toluene under a CO atmosphere at room temperature overnight both before and after the hydrogenation. The DRIFT spectra of both of the resultant samples showed two v(CO) bands at 2093 and 2030 cm$^{-1}$, which are about the same as those of Rh(CO)$_2$(N~N)Cl and of the products obtained from the reaction of CO with Rh(COD)(N~N)Cl and Rh(COD)(N~N)/SiO$_2$. This result indicates that after hydrogenation, the rhodium of the combined catalyst, Rh(COD)(N~N)/Pd—SiO$_2$, is still attached to the tether. This point is further demonstrated by the observation that the catalyst may be used repeatedly for the hydrogenation of toluene as described in Example 3 below.

EXAMPLE 3

The catalyst Rh(COD)(N—N)/Pd—SiO$_2$ in Example 2 was used repeatedly for the hydrogenation of toluene. The procedure was as follows: After filtration, the used catalyst was washed with toluene two times and dried in vacuum at room temperature. The resulting catalyst was reused for the hydrogenation of toluene in the same way and under the same conditions as those mentioned in Example 2. The results are shown in Table 8.

TABLE 8

Durability of Rh(COD)(N~N)/Pd—SiO$_2$ catalyst during repeated hydrogenation reactions of toluene

| Reaction cycle | Maximum TOF[a] (molH$_2$/molRh min) | TO[b] (molH$_2$/molRh) |
|---|---|---|
| 1st | 1.7 | 921 (11) |
| 2nd | 4.3 | 2171 (11) |
| 3rd | 4.5 | 2236 (11) |
| 4th | 3.7 | 1468 (11) |
| 5th | 2.1 | 938 (11) |

[a]TOF defined as moles of H$_2$ reacting per mole rhodium per min.
[b]Turnover corresponds to the reaction time in parentheses (in h).

The data in Table 8 show that this catalyst is active for several cycles of the hydrogenation of toluene. The activity decrease in the 4th and 5th cycles may result from the fact that the catalyst particles fracture over long stirring periods with a stirring bar. This could be avoided by using another stirring method.

EXAMPLE 4

Catalyst: Rh—CNR$_3$/Pd—SiO$_2$

Catalytic reaction: Hydrogenation of toluene

A=Pd—SiO$_2$; B—C=RhCl|CN(CH$_2$)$_3$Si(OC$_2$H$_5$)$_3$|$_3$ (Rh—CNR$_3$)

B—C/A: RhCl|CN(CH$_2$)$_3$Si(OC$_2$H$_5$)$_3$|$_3$/Pd—SiO$_2$ (Rh—CNR$_3$/Pd—SiO$_2$)

These components refer to those listed in the "Summary of the Invention" above.

(1) Preparation of the catalysts

Pd—SiO$_2$ was prepared in the same way as that stated in Example 1, section 1, subsection (2). To a 10 mL toluene solution of |Rh(COD)Cl|$_2$ (0.045 g, 0.090 mmol) was added dropwise 0.13 mL (0.54 mmol) of CN(CH$_2$)$_3$Si(OC$_2$H$_5$)$_3$. The mixture was stirred at room temperature for 30 min to give a toluene solution of RhCl|CN(CH$_2$)$_3$Si(OC$_2$H$_5$)$_3$|$_3$ (IR: v(NC) 2157(s), 2119(m) cm$^{-1}$). This solution was added to a flask containing 1.0 g Pd—SiO$_2$ under vacuum. The mixture was refluxed for 4 h. After filtration, the solid was washed with toluene (5×10 mL) and then dried in vacuum at room temperature. The catalyst, RhCl|CN(CH$_2$)$_3$Si(OC$_2$H$_5$)$_3$|$_3$/Pd—SiO$_2$ (Rh—CNR$_3$/Pd—SiO$_2$), contains 1.35 wt % Rh and exhibits v(NC) bands in the DRIFT spectrum at 2176(s), 2124(w) cm$^{-1}$.

The rhodium isocyanide complex catalyst tethered on SiO$_2$, RhCl|CN(CH$_2$)$_3$Si(OC$_2$H$_5$)$_3$/SiO$_2$ (Rh—CNR$_3$/SiO$_2$), was prepared in the same way as that for the preparation of Rh—CNR$_3$/Pd—SiO$_2$, except SiO$_2$ was used instead of Pd—SiO$_2$. The rhodium content of the catalyst was 1.0 wt %, DRIFT: v(NC) 2176(s), 2124(w) cm$^{-1}$.

(2) Catalytic reaction

The catalytic hydrogenation reactions were carried out in the same way and under the same conditions as those stated in Example 1.

(3) Results

The activities of the catalysts for the hydrogenation of toluene are listed in Table 9.

TABLE 9

Hydrogenation of toluene to methylcyclohexane

| Run | Catalyst | Maximum TOF[a] (molH$_2$/molRh min) | TO[b] (molH$_2$/molRh) | H$_2$ uptake[b] (mL) |
|---|---|---|---|---|
| 1 | Pd—SiO$_2$ (50 mg) | — | — | 23.5 (23) |
| 2 | Rh—CNR$_3$ (20 μmol) | 0 | 0 (6) | 0 (6) |
| 3 | Rh—CNR$_3$/SiO$_2$ (50 mg, 4.85 μmol Rh) | 0.7 | 143 (8.5) | 21 (8.5) |
| 4 | Rh—CNR$_3$/Pd—SiO$_2$ (50 mg, 6.55 μmol Rh) | 5.5 | 2417 (8.5) | 212 (8.5) |

[a]TOF defined as moles of H$_2$ reacting per mole rhodium per min.
[b]Turnover and H$_2$ uptake correspond to the reaction time in parentheses (in h).

(4) Discussion

The data in Table 9 show that the combined homogeneous-heterogeneous catalyst Rh—CNR$_3$/Pd—SiO$_2$, is not only much more active (Run 4) than either the homogeneous catalyst Rh—CNR$_3$ (Run 2) or the heterogeneous catalyst Pd—SiO$_2$ (Run 1) alone, but also much more active than the rhodium complex catalyst tethered on SiO$_2$ (Run 3). After a hydrogenation reaction, the DRIFT spectrum of the catalyst Rh—CNR$_3$/Pd—SiO$_2$ shows the same two v(NC) bands at 2176(s), 2124(w) cm$^{-1}$ as the original catalyst. No infrared absorptions for —NH$_2$ and free —NC groups were observed in the spectra of the used catalyst or the reaction solution. This result indicates that the rhodium is still coordinated to the tether, which is attached to the surface of the Pd—SiO$_2$ heterogeneous catalyst.

arenes other than toluene. The reaction rate is greater for arenes with electron donor substituents than for arenes with electron withdrawing substituents.

TABLE 11

Hydrogenation of arenes with Rh—CNR$_3$/Pd—SiO$_2$ catalyst

| Run | Substrate | Maximum TOF$^a$ (molH$_2$/molRh min) | TO$^b$ (molH$_2$/molRh) | Product |
|---|---|---|---|---|
| 1 | Methyl benzoate | 1.7 | 830 (12) | methyl cyclohexanecarbonxylate |
| 2 | Toluene | 5.6 | 1122 (9) | methylcyclohexane |
| 3 | Naphthalene | 4.7 | 2171 (9) | tetrahydronaphthalene (88%) decahydronaphthalene (12%) |
| 4 | Anisole | 6.6 | 2808 (9) | methyl cyclohexyl ether |

$^a$TOF defined as moles of H$_2$ reacting per mole Rh per min.
$^b$Turnover corresponds to the reaction time in parentheses (in h).
Reaction conditions: catalyst 25 mg, substrate 5 mmol, solvent 5 mL heptane, 40° C., 1 atm.

EXAMPLE 5

The Rh—CNR$_3$/Pd—SiO$_2$ catalyst described in Example 4 was used repeatedly for the hydrogenation of toluene. After filtration, the used catalyst was washed with toluene two times and dried in vacuum at room temperature. The resulting catalyst was reused for the hydrogenation of toluene in the same way and under the same conditions as those given in Example 4. The results are shown in Table 10.

TABLE 10

Durability of Rh—CNR$_3$/Pd—SiO$_2$ catalyst during repeated hydrogenation reactions of toluene

| Reaction cycle | Maximum TOF$^a$ (molH$_2$/molRh min) | TO$^b$ (molH$_2$/molRh) |
|---|---|---|
| 1st | 5.5 | 6915 (24.5) |
| 2nd | 4.6 | 5713 (24.5), 6949 (31) |
| 3rd | 4.0 | 6770 (24.5), 7159 (27) |

$^a$TOF defined as moles of H$_2$ reacting per mole rhodium per min.
$^b$Turnover corresponds to the reaction time in parentheses (in h).

The data in Table 10 show that this catalyst is active for at least three cycles in the hydrogenation of toluene. DRIFT spectral analysis of the catalyst used for three cycles shows that neither —NH$_2$ nor free —NC groups are present.

EXAMPLE 6

The Rh—CNR$_3$/Pd—SiO$_2$ catalyst was also used for the hydrogenation of arenes other than toluene. The procedure and the reaction conditions are the same as those in Example 4. The results are given in Table 11.

From Table 11 it can be seen that the Rh—CNR$_3$/Pd—SiO$_2$ catalyst is also very active for the hydrogenation of

EXAMPLE 7

Catalyst: Rh—CNR$_2$/Pd—SiO$_2$

Catalytic reaction: Hydrogenation of toluene

A=Pd—SiO$_2$; B—C=RhCl(CO)[CN(CH$_2$)$_3$Si(OC$_2$H$_5$)$_3$]$_2$ (Rh—CNR$_2$)

B—C/A: RhCl(CO)[CN(CH$_2$)$_3$Si(OC$_2$H$_5$)$_3$]$_2$/Pd—SiO$_2$ (Rh—CNR$_2$/Pd—SiO$_2$)

These components refer to those listed in the "Summary of the Invention" above.

(1) Preparation of the catalysts

Pd—SiO$_2$ was prepared in the same way as described in Example 1, section 1, subsection (2). To a 10 mL toluene solution of [Rh(CO)$_2$Cl]$_2$ (0.035 g, 0.090 mmol) was added 0.80 mL (0.36 mmol) of CN(CH$_2$)$_3$Si(OC$_2$H$_5$)$_3$. The mixture was stirred at room temperature for 1 h to obtain a toluene solution of RhCl(CO)[CN(CH$_2$)$_3$Si(OC$_2$H$_5$)$_3$]$_2$ (Rh—CNR$_2$) (IR: v(NC) 2192(s), v(CO) 1996(s) cm$^{-1}$). This toluene solution of Rh—CNR$_2$ was added to a flask containing 1.0 g Pd—SiO$_2$ under vacuum. The mixture was refluxed for 4 h. After filtration, the solid was washed with toluene (2×15 mL), and then dried in vacuum at room temperature. Thus, the catalyst of Rh—CNR$_2$/Pd—SiO$_2$ was obtained. The rhodium content of the catalyst was 1.1 wt %. DRIFT: v(NC) 2197(s), 2181(s); v(CO) 2016(s) cm$^{-1}$.

The catalyst, RhCl(CO)[CN(CH$_2$)$_3$Si(OC$_2$H$_5$)$_3$]$_2$/SiO$_2$ (Rh—CNR$_2$/SiO$_2$), consisting of the rhodium isocyanide complex tethered on SiO$_2$ was prepared in the same way as that used in the preparation of Rh—CNR$_2$/Pd—SiO$_2$, except SiO$_2$ was used instead of Pd—SiO$_2$. The rhodium content of the Rh—CNR$_2$/SiO$_2$ catalyst was 1.30 wt %, DRIFT: v(NC) 2197(s), 2181(s) cm$^{-1}$; v(CO) 2016(s) cm$^{-1}$.

(2) Catalytic reaction

The catalytic hydrogenation was carried out in the same way and under the same conditions as those stated in Example 1.

(3) Results

The activities of the catalysts for the hydrogenation of toluene are given in Table 12.

It can be seen that the activity of the combined catalyst, Rh—CNR$_2$/Pd—SiO$_2$, is higher (Run 4) than those of the homogeneous catalyst Rh—CNR$_2$ (Run 2) and the heterogeneous supported metal catalyst Pd—SiO$_2$ (Run 1), and it is also higher than the SiO$_2$-anchored complex catalyst Rh—CNR$_2$/SiO$_2$ (Run 3). After a hydrogenation run, the DRIFT spectrum of the used catalyst showed no evidence for —$NH_2$ or free —NC on the catalyst, which suggests that the rhodium in the used catalyst is still coordinated to the —NC group.

TABLE 12

Hydrogenation of toluene to methylcyclohexane

| Run | Catalyst | Maximum TOF[a] ($molH_2$/molRh min) | TO[b] ($molH_2$/molRh) | $H_2$ uptake[b] (mL) |
|---|---|---|---|---|
| 1 | Pd—$SiO_2$ (50 mg) | — | — | 23.5 (23) |
| 2 | Rh—$CNR_2$ (20 μmol) | 0.08 | 57 (18) | 25.5 (6) |
| 3 | Rh—$CNR_2$/$SiO_2$ (50 mg, 6.31 μmol Rh) | 0 | 0 (8.5) | 0 (8.5) |
| 4 | Rh—$CNR_2$/Pd—$SiO_2$ (50 mg, 5.34 μmol Rh) | 4.8 | 1748 (8.5) | 188 (8.5) |

[a]TOF defined as moles of $H_2$ reacting per mole rhodium per min.
[b]Turnover and $H_2$ uptake correspond to the reaction time in parentheses (in h).

EXAMPLE 8

Catalyst: Pt—$CNR_2$/Pd—$SiO_2$

Catalytic reaction: Hydrogenation of cyclohexanone

A=Pd—$SiO_2$; B—C: $PtCl_2|CN(CH_2)_3Si(OC_2H_5)_3|_2$ (Pt—$CNR_2$)

B—C/A=$PtCl_2|CN(CH_2)_3Si(OC_2H_5)_3|_2$/Pd—$SiO_2$ (Pt—$CNR_2$/Pd—$SiO_2$)

These components refer to those listed in the "Summary of the Invention" above.

(1) Preparation of the catalysts

Pd—$SiO_2$ was prepared in the same way as described in Example 1, section 1, subsection (2). A mixture of $PtCl_2$ $(C_6H_5CN)_2$ (0.14 g, 0.30 mmol) and $CN(CH_2)_3Si(OC_2H_5)_3$ (0.14 mL, 0.60 mmol) in 10 mL $CH_2Cl_2$ was stirred at room temperature for 1 h. After the solvent was removed under vacuum, the oily residue was washed with pentane and then dried in vacuum at room temperature. The resulting solid was dissolved in 10 mL $CH_2Cl_2$; an IR spectrum of this solution showed bands characteristic of $PtCl_2[CN(CH_2)_3Si(OC_2H_5)_3]_2$ (Pt—$CNR_2$) at v(NC) 2263(s), 2237(m) $cm^{-1}$. This $CH_2Cl_2$ solution was added to a flask containing 1.0 g Pd—$SiO_2$ under vacuum. The mixture was refluxed for 4 h. After filtration, the solid was washed with $CH_2Cl_2$ (3×15 mL) and dried in vacuum at room temperature to give the combined catalyst $PtCl_2|CN(CH_2)_3Si(OC_2H_5)_3|_2$/Pd—$SiO_2$ (Pt—$CNR_2$/Pd— $SiO_2$). The platinum content of this catalyst was 1.9 wt %. DRIFT: v(NC) 2265(m), 2236(s) $cm^{-1}$.

The catalyst, $PtCl_2|CN(CH_2)_3Si(OC_2H_5)_3|_2$/$SiO_2$ (Pt—$CNR_2$/$SiO_2$), consisting of the platinum isocyanide complex tethered on $SiO_2$ was prepared by the same method as that given for the preparation of Pt—$CNR_2$/Pd—$SiO_2$, except $SiO_2$ was used instead of Pd—$SiO_2$. The platinum content of the catalyst was 2.9 wt %. DRIFT: v(NC) 2267(s), 2245(s) $cm^{-1}$.

(2) Catalytic reaction

The catalytic hydrogenation of cyclohexanone was carried out in a three necked, jacketed bottle closed with a self-sealing silicon rubber cap; the bottle was connected to a vacuum/hydrogen line and a constant pressure gas buret. The temperature of the ethylene glycol circulating through the jacket was maintained by a constant temperature bath. The reaction temperature and hydrogen pressure were 40° C. and 1 atm, respectively. After the catalyst was added and the atmosphere in the bottle was replaced with hydrogen, 5 mL ethanol and 1 mL cyclohexanone were added and the amount of hydrogen taken up in the reaction was followed by the constant-pressure gas buret. The product was analyzed by gas chromatography.

(3) Results

Activities of catalysts for the hydrogenation of cyclohexanone are shown in Table 13.

From Table 13 it can be seen that the combined catalyst Pt—$CNR_2$/Pd—$SiO_2$ (Run 4) is more active than the homogeneous complex catalyst Pt—$CNR_2$ (Run 2) and the heterogeneous supported palladium catalyst (Run 1), and it is also more active than the platinum complex catalyst tethered on $SiO_2$ (Run 3). After a hydrogenation run, an IR analysis showed that there were neither —$NH_2$ nor free —NC groups in samples of the used catalyst or in the reaction solution. This indicates that the platinum is still coordinated to the isocyanide tethering ligands.

TABLE 13

Hydrogenation of cyclohexanone to cyclohexanol

| Run | Catalyst | Maximum TOF[a] ($molH_2$/molPt min) | TO[b] ($molH_2$/molPt) | $H_2$ uptake[b] (mL) |
|---|---|---|---|---|
| 1 | Pd—$SiO_2$ (50 mg) | — | — | 10.2 (3.5) |
| 2 | Pt—$CNR_2$ (5 μmol) | 0.4 | 113 (6) | 12.6 (6) |
| 3 | Pt—$CNR_2$/$SiO_2$ (50 mg, 7.42 μmol) | 0 | 0 (10) | 0 (10) |
| 4 | Pt—$CNR_2$/Pd—$SiO_2$ (50 mg, 4.87 μmol) | 1.9 | 562 (6) | 61.3 (6) |

[a]TOF defined as moles of $H_2$ reacting per mole Pt per min.
[b]Turnover and $H_2$ uptake correspond to the reaction time in parentheses (in h).

EXAMPLE 9

Catalyst: Pd—$H_2$N/Ni—$SiO_2$

Catalytic reaction: Hydrogenation of cyclohexene

A=Ni—$SiO_2$; B—C=PdCl$_2$|$H_2$N(CH$_2$)$_3$Si(OC$_2$H$_5$)$_3$|$_2$ (Pd—$H_2$N)

B—C/A: PdCl$_2$|$H_2$N(CH$_2$)$_3$Si(OC$_2$H$_5$)$_3$|$_2$/Ni—$SiO_2$ (Pd—$H_2$N/Ni—$SiO_2$)

(1) Preparation of the catalysts

The silica-supported nickel catalyst, Ni—$SiO_2$ was prepared as described in section 1, subsection 2 of Example 1.

A mixture of PdCl$_2$(CH$_3$CN)$_2$ (0.23 g, 0.85 mmol) and $H_2$N(CH$_2$)$_3$Si(OC$_2$H$_5$)$_3$ (0.41 mL, 1.7 mmol) in 9 mL toluene was stirred at room temperature for 1 h to give a toluene solution of PdCl$_2$|$H_2$N(CH$_2$)$_3$Si(OC$_2$H$_5$)$_3$|$_2$ (Pd—$H_2$N). This solution was added to a flask containing 1.0 g Ni—$SiO_2$. The mixture was refluxed for 4 h. After filtration, the solid was washed with toluene (3×15 mL) and then dried in vacuum at room temperature. The catalyst, PdCl$_2$|$H_2$N(CH$_2$)$_3$Si(OC$_2$H$_5$)$_3$|$_2$/Ni—$SiO_2$ (Pd—$H_2$N/Ni—$SiO_2$), had a palladium content of 2.1 wt %.

The catalyst, PdCl$_2$|$H_2$N(CH$_2$)$_3$Si(OC$_2$H$_5$)$_3$|$_2$/$SiO_2$ (Pd—$H_2$N/$SiO_2$), with the palladium complex tethered on $SiO_2$ was prepared in the same way as that for the preparation of Pd—$H_2$N/Ni—$SiO_2$, except $SiO_2$ was used instead of Ni—$SiO_2$. The palladium content of the catalyst was 2.1 wt %.

(2) Catalytic reaction

The hydrogenation of cyclohexene was carried out in a three necked, jacketed bottle closed with a self-sealing rubber cap; the bottle was connected to a vacuum/hydrogen line and a constant pressure gas buret. The temperature of the ethylene glycol circulating through the jacket was maintained by a constant temperature bath. The reaction temperature and $H_2$ pressure were 40° C. and 1 atm. After the catalyst was added and the atmosphere in the bottle was replaced by hydrogen, 5 mL of toluene and 0.5 mL of cyclohexene were added and the hydrogen consumed by the reaction was followed using the constant-pressure gas buret. The product was analyzed by gas chromatography.

(3) Results

The activities of the catalysts for the hydrogenation of cyclohexene are listed in Table 14.

The experimental results in Table 14 indicate that the combined catalyst consisting of the homogeneous palladium complex catalyst and the heterogeneous silica-supported nickel metal catalyst is much more active (Run 4) than the two catalysts alone (Runs 1 and 2); it is also more active than the palladium complex catalyst tethered on $SiO_2$ (Run 3). This combined catalyst has good stability for the hydrogenation of cyclohexene; this is shown in Example 10.

EXAMPLE 10

The catalyst, Pd—$H_2$N/Ni—$SiO_2$, in Example 9 was used repeatedly for the hydrogenation of cyclohexene. After a catalytic run, the reaction mixture was filtered and the used catalyst was washed with toluene two times and dried in vacuum at room temperature. The resulting catalyst was reused in the hydrogenation of cyclohexene under the same conditions as those described in Example 9. The results are shown in Table 15.

The data in Table 15 shows that the Pd—$H_2$N/Ni—$SiO_2$ catalyst retains its activity through at least 4 cycles. The activity decrease in the 4th cycle may result from breakdown of the catalyst particles during long stirring times with a stirring bar.

TABLE 15

Durability of Pd—$H_2$N/Pd—$SiO_2$ catalyst during repeated hydrogenation reactions of cyclohexene

| Reaction cycle | Maximum TOF[a] (molH$_2$/molPd min) | TO[b] (molH$_2$/molPd) |
|---|---|---|
| 1st | 8.0 | 431 (3) |
| 2nd | 7.6 | 402 (3) |
| 3rd | 5.6 | 471 (3) |
| 4th | 4.1 | 367 (3) |

[a]TOF defined as moles of $H_2$ reacting per mole Pd per min.
[b]Turnover corresponds to the reaction time in parentheses (in h).

EXAMPLE 11

Catalyst: Pd—$H_2$N/Ni—$SiO_2$

Catalytic reaction: Carbonylation of allyl bromide to butenoic acid

A=Ni—$SiO_2$; B—C=PdCl$_2$|$H_2$N(CH$_2$)$_3$Si(OC$_2$H$_5$)$_3$|$_2$ (Pd—$H_2$N)

B—C/A: PdCl$_2$[$H_2$N(CH$_2$)$_3$Si(OC$_2$H$_5$)$_3$]$_2$/Ni—$SiO_2$ (Pd—$H_2$N/Ni—$SiO_2$)

These components refer to those listed in the "Summary of the Invention" above.

(1) The catalyst was prepared in the same way as that described in Example 9.

(2) Catalytic reaction

The carbonylation of allyl bromide was carried out in a three necked, jacketed bottle closed with a self-sealing silicon rubber cap; the bottle was connected to a vacuum/carbon monoxide line and a constant pressure gas buret. The temperature of the ethylene glycol circulating through the jacket was maintained by a constant temperature bath. The

TABLE 14

Hydrogenation of cyclohexene to cyclohexane

| Run | Catalyst | Maximum TOF[a] (molH$_2$/molPd min) | TO[b] (molH$_2$/molPd) | $H_2$ uptake[b] (mL) |
|---|---|---|---|---|
| 1 | Ni—$SiO_2$ (50 mg) | — | — | 0 (5) |
| 2 | Pd—$H_2$N (5.2 μmol) | 0.4 | 20 (3) | 2.3 (3) |
| 3 | Pd—$H_2$N/$SiO_2$ (50 mg, 10 μmol) | 0.5 | 71 (3) | 16 (3) |
| 4 | Pd—$H_2$N/Ni—$SiO_2$ (50 mg, 10 μmol) | 8.0 | 431 (3) | 96.5 (3) |

[a]TOF defined as moles of $H_2$ reacting per mole Pd per min.
[b]Turnover and $H_2$ uptake correspond to the reaction time in parentheses (in h).

reaction temperature and carbon monoxide pressure were 40° C. and 1 atm, respectively. The catalyst and 0.47 g (12 mmol) sodium hydroxide were added and the atmosphere in the bottle was replaced with carbon monoxide. Then, 5 mL toluene, 5 mL water and 0.50 mL (5.9 mmol) allyl bromide were added successively. The amount of CO consumed in the reaction was followed by the constant-pressure gas buret.

(3) Results

Table 16 gives results of the carbonylation of allyl bromide over the catalysts.

TABLE 16

Carbonylation of allyl bromide to butenoic acid

| Run | Catalyst | Maximum TOF$^a$ (molCO/molPd min) | TO$^b$ (molCO/molPd) | CO uptake$^b$ (mL) |
|---|---|---|---|---|
| 1 | Ni—SiO$_2$ (50 mg) | — | — | 16 (7) |
| 2 | Pd—H$_2$N (10 μmol) | 3.5 | 514 (4.5) | 115 (4.5) |
| 3 | Pd—H$_2$N/SiO$_2$ (50 mg, 10 μmol) | 1.0 | 302 (9) | 65 (9) |
| 4 | Pd—H$_2$N/Ni—SiO$_2$ (50 mg, 10 μmol) | 2.9 | 461 (7) | 99 (7) |

$^a$TOF defined as moles of H$_2$ reacting per mole Pd per min.
$^b$Turnover and H$_2$ uptake correspond to the reaction time in parentheses (in h).

From the data in Table 16 it can be seen that the activity of the palladium complex catalyst tethered on the silica supported nickel metal catalyst (Run 4) is higher than that of the same palladium complex catalyst tethered on silica (Run 3). However, its activity is somewhat lower than that of the homogeneous palladium catalyst (Run 2). Despite this lower activity, the catalyst in Run 4 is much easier to separate from the reaction mixture than the homogeneous catalyst in Run 2.

EXAMPLE 12

(1) Catalyst

Rh/γ—Al$_2$O$_3$ (2) Catalytic reactions

Hydrogenations of toluene and anisole to methylcyclohexane and methyl cyclohexyl ether, respectively The heterogeneous supported rhodium metal catalyst, Rh/γ—Al$_2$O$_3$, was a commercial catalyst purchased from Johnson Matthey Company. The rhodium content of the catalyst was 5.0 wt %. This catalyst was used for the hydrogenation of toluene and anisole at 40° C. and 1 atm. The results are listed in Table 17.

TABLE 17

Hydrogenation of toluene and anisole to methylcyclohexane and methyl cyclohexyl ether with Rh/γ-Al$_2$O$_3$ catalyst

| Catalyst | Substrate | Maximum TOF$^a$ (molH$_2$/molRh min) | TO$^b$ (molH$_2$/molRh) |
|---|---|---|---|
| 50 mg (24.3 μmol Rh) | toluene$^c$ | 3.8 | 1962 (9) |
| 25 mg (12.1 μmol Rh) | anisole$^d$ | 7.5 | 1035 (6) |

$^a$TOF defined as moles of H$_2$ reacting per mole rhodium per min.
$^b$Turnover corresponds to the reaction time in parentheses (in h).
$^c$Reaction conditions are the same as those in example 1.
$^d$Reaction conditions are the same as those in example 6.

The data in Table 17 show that the alumina-supported rhodium metal catalyst is also active for the hydrogenation of toluene and anisole under the mild conditions. As compared with the maximum TOF (3.8 molH$_2$/molRh min) of Rh/γ—Al$_2$O$_3$ for the hydrogenation of toluene, the activities of the rhodium complex catalysts tethered on the silica-supported palladium metal catalyst (Tables 7, 9 and 12) under the same conditions are either higher or lower: Rh—CNR$_3$/Pd—SiO$_2$ (5.5 molH$_2$/molRh min), Rh—CNR$_2$/Pd—SiO$_2$ (4.8 molH$_2$/molRh min) and Rh(COD)N~N)/Pd—SiO$_2$ (1.7 molH$_2$/molRh min). All of the tethered rhodium complex catalysts have higher activities than any reported homogeneous or immobilized rhodium complex catalysts for the hydrogenation of arenes under the mild conditions of 40° C. and 1 atm. (See *All-Cis Catalytic Hydrogenation of Polynuclear Aromatic HC by Group 5 Metal Aryloxide Compounds*, J. S. Yu, et al., J. Am. Chem. Soc., 114, 1927 (1992)).

Although the present invention has been described in considerable detail with reference to certain preferred versions thereof, other versions are possible. For example, the first catalyst system can be an enzyme or any number of other suitable first catalyst systems, and the supported catalyst can be a metal mixture having a zeolite support as well as other suitable supported catalysts. Also, the reactions described herein can also be carried out in a flow reactor rather than as a batch process.

The above examples clearly demonstrate that not only does this catalyst system exhibit extraordinarily high catalytic activity even after repeated uses, but it also has the advantage of being easily separated from the pure product, making it easily recyclable and economical. Further, because of the very high catalytic activity, lower reaction temperatures and/or lower amounts of catalytically active metal may be employed to achieve a desired rate of productivity than is possible when less active catalysts are employed. Although the examples include primarily hydrogenation reactions, this invention has application in a myriad of reactions including, but not limited to oxidation, hydroformylation, hydration, solvolysis, isomerization, dimerization, oligomerization, polymerization, hydrocyanation, olefin metathesis, hydrosilation, carbonylation, enantioselective catalysis and photoduplication. Therefore, the spirit and scope of the appended claims should not be limited to the description of the preferred embodiments contained herein.

What is claimed:

1. A process for the formation of a catalyst comprising the steps of:

a) providing a first catalyst on a catalyst carrier;

b) providing a reactive compound comprising a catalyst moiety secured to a tethering linkage, said tethering linkage having an end group which is reactive with said first catalyst on a catalyst carrier either through the first catalyst or through the carrier;

c) reacting said end group with the first catalyst on a catalyst carrier to tether the catalyst moiety to the first catalyst on said carrier: wherein said catalyst moiety is a different catalyst than said first catalyst.

2. The process of claim 1 wherein said reacting is performed under conditions in which the end group is not as reactive with the catalyst moiety as the end group is reactive with said first catalyst on a catalyst carrier.

3. The process of claim 1 wherein said first catalyst on a catalyst carrier comprises a supported heterogeneous catalyst.

4. The process of claim 1 wherein said catalyst moiety comprises a homogeneous catalyst.

5. The process of claim 1 wherein said reactive compound is a homogeneous catalyst.

6. The process of claim 2 wherein said first catalyst on a catalyst carrier comprises a supported heterogeneous catalyst.

7. The process of claim 3 wherein said catalyst moiety comprises a homogeneous catalyst.

8. The process of claim 6 wherein said catalyst moiety comprises a homogeneous catalyst.

9. A catalyst comprising a supported metal catalyst to which is tethered a second catalyst wherein said second catalyst comprises a different metal catalyst than the supported metal catalyst.

10. The catalyst of claim 9 wherein said second catalyst is a homogeneous catalyst.

11. The catalyst of claim 9 wherein said second catalyst comprises a metal complex.

12. The catalyst of claim 9 wherein said second catalyst is tethered to said supported catalyst by a group comprising SiO linkages.

13. The catalyst of claim 12 wherein said second catalyst is tethered to said supported catalyst by an organic group comprising SiO linkages.

14. A process for the formation of a catalyst comprising the steps of:

a) providing a first catalyst on a catalyst carrier;

b) providing a reactive compound comprising a catalyst moiety secured to a tethering linkage, said tethering linkage having an end group which is reactive with said first catalyst on a catalyst carrier either through the first catalyst or through the carrier;

c) reacting said end group with the first catalyst on a catalyst carrier to tether the catalyst moiety to the first catalyst on said catalyst carrier, wherein said reacting is performed under conditions in which the end group is not as reactive with the catalyst moiety as the end group is reactive with said first catalyst on a catalyst carrier, said first catalyst on a catalyst carrier comprises a supported heterogeneous catalyst, and said catalyst moiety comprises a homogeneous catalyst, wherein said supported heterogeneous catalyst comprises metals selected from the group consisting of Pd, Pt, Ni, Co, Fe, Sn, Cd, Sr, Mg, Mn, Zn, Cr, Al, Ag, Au, Ir, Os, Ru, Ti, Zr, and Rh and said homogeneous catalyst comprises metals selected from the group consisting of Ti, V, Cr, Mn, Fe, Co, Ni, Mo, Re, Ru, Rh, Pd, Pt, Ta, Os, Ir, Zn, Cd, Sn, Sr, Mg, Sb, Se, Al and Bi.

15. The process of claim 14 wherein said homogeneous catalyst comprises complexes of metals selected from the group consisting of Ni, Rh, Ir, Mo, and Al.

16. The process of claim 14 wherein said supported catalyst comprises an inorganic oxide.

17. The process of claim 15 wherein said supported catalyst comprises an inorganic oxide.

18. A catalyst comprising a supported metal catalyst to which is tethered a second catalyst according to claim 9, wherein said supported metal catalyst comprises a heterogeneous catalyst and said second catalyst comprises a homogeneous catalyst.

19. A catalyst comprising a supported metal catalyst to which is tethered a second catalyst according to claim 18, wherein said supported metal catalyst comprises a heterogeneous catalyst comprising metals selected from the group consisting of Pd, Pt, Ni, Co, Fe, Sn, Cd, Sr, Mg, Mn, Zn, Cr, Al, Ag, Au, Ir, Os, Ru, Ti, Zr, and Rh and said second catalyst comprises a homogeneous catalyst comprising metals selected from the group consisting of Ti, V, Cr, Mn, Fe, Co, Ni, Mo, Re, Ru, Rh, Pd, Pt, Ta, Os, Ir, Zn, Cd, Sn, Sr, Mg, Sb, Se, Al and Bi.

* * * * *